(12) United States Patent
Yoshimoto et al.

(10) Patent No.: US 6,472,458 B2
(45) Date of Patent: Oct. 29, 2002

(54) LAMP REFLECTOR AND METHOD OF MANUFACTURING THE SAME

(75) Inventors: Yuji Yoshimoto; Toshimasa Ikeda; Junji Toki, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 124 days.

(21) Appl. No.: 09/749,652

(22) Filed: Dec. 28, 2000

(65) Prior Publication Data

US 2001/0005318 A1 Jun. 28, 2001

(30) Foreign Application Priority Data

Dec. 28, 1999 (JP) ............................................ 11-372155

(51) Int. Cl.⁷ ................................................. C08K 3/00
(52) U.S. Cl. ....................................................... 524/425
(58) Field of Search ......................................... 524/425

(56) References Cited

U.S. PATENT DOCUMENTS

| | | |
|---|---|---|
| 5,945,775 A | 8/1999 | Ikeda et al. |
| 5,985,465 A | 11/1999 | Daichou et al. |

*Primary Examiner*—Edward J. Cain
(74) *Attorney, Agent, or Firm*—Sughrue Mion, PLLC (57) ABSTRACT

A lamp reflector having a substrate in which desired surface smoothness and rigidity are ensured, while the dimensional accuracy is high. Also, a method of manufacturing such a lamp reflector. In order to ensure surface smoothness, rigidity, and high dimensional accuracy, the lamp reflector is provided with a substrate made of a composition containing at least polyphenylene sulfide resin (PPS resin), synthetic calcium carbonate whiskers, and synthetic calcium carbonate ($CaCO_3$). And the method for manufacturing this lamp reflector includes injection molding using high-pressure gas.

14 Claims, 9 Drawing Sheets

| EXAMPLE 1 | PPS RESIN (wt%) | REINFORCEMENT MATERIAL | |
|---|---|---|---|
| | | SYNTHETIC CALCIUM CARBONATE WHISKERS (wt%) | SYNTHETIC (LIGHT) CALCIUM CARBONATE (wt%) |
| | 40 | 30 | 30 |

FIG. 3(b)

| COMPARATIVE EXAMPLE 1 | PPS RESIN (wt%) | REINFORCEMENT MATERIAL | |
|---|---|---|---|
| | | NATURAL CALCIUM SILICATE WHISKERS (wt%) | NATURAL (HEAVY) CALCIUM CARBONATE (wt%) |
| | 40 | 20 | 40 |

FIG. 3(c)

| COMPARATIVE EXAMPLE 2 | UNSATURATED POLYESTER RESIN (CONTAINING LOW PROFILE ADDITIRE) (wt%) | REINFORCEMENT MATERIAL | |
|---|---|---|---|
| | | GLASS FIBERS (wt%) | NATURAL (HEAVY) CALCIUM CARBONATE (wt%) |
| | 25 | 20 | 55 |

FIG. 3(d)

| COMPARATIVE EXAMPLE 3 | POLYETHER IMIDE RESIN (wt%) | REINFORCEMENT MATERIAL |
|---|---|---|
| | 100 | — |

FIG. 4

| ITEMS | | | EXAMPLE 1 | COMPARATIVE EXAMPLE 1 | COMPARATIVE EXAMPLE 2 | COMPARATIVE EXAMPLE 3 |
|---|---|---|---|---|---|---|
| SURFACE SMOOTHNESS UPPER ROW Ra (nm) LOWER ROW Rt (nm) (EXISTENCE OF UNDER COAT LAYER) | | | 24 200 (NO) | 43 330 (NO) | 20 150 (YES) | 22 160 (NO) |
| TOP COAT DURABILITY IN EACH THICKNESS (ALKALI RESISTANCE) JUDGMENT | FILM THICKNESS | 30nm | × | × | × | × |
| | | 50nm | ○ | × | ○ | ○ |
| | | 100nm | ○ | × | ○ | ○ |
| | | 200nm | ○ | ○ | ○ | ○ |
| RIGIDITY | BENDING MODULUS (GPa) | | 10 | 12 | 13 | 3 |
| | JUDGMENT | | ○ | ○ | ○ | × |
| HEAT RESISTANCE | UPPER LIMIT TEMPERATURE (°C) | | 230 | 230 | 200 | 200 |
| | JUDGMENT | | ○ | ○ | △ | △ |
| LIGHT DISTRIBUTION PERFORMANCE JUDGMENT (OPTICAL AXIS DISPLACEMENT) | WITH STEPS | | ○ | ○ | × | △ |
| | WITHOUT STEPS | | ○ | ○ | ○ | × |

| AREA | COMPONENTS (wt%) | | | SURFACE SMOOTHNESS UPPER ROW Ra (nm) LOWER ROW Rt (nm) | RIGIDITY BENDING MODULUS (GPa) |
|---|---|---|---|---|---|
| | PPS RESIN | SYNTHETIC CALCIUM CARBONATE WHISKERS | (LIGHT) SYNTHETIC CALCIUM CARBONATE | | |
| A | 40 | 30 | 30 | 24 / 200 | 10.0 |
| B | 45 | 40 | 15 | 45 / 340 | 12.5 |
| C | 55 | 20 | 25 | 21 / 180 | 7.0 |
| D | 25 | 10 | 65 | 30 / 270 | 8.0 |

(NO DESCRIPTION ABOUT AREA E)

FIG. 9 of the present invention to provide a lamp reflector in which reinforcement materials to be kneaded and dispersed into a basic material forming a substrate of the lamp reflector are specified so that the particle shape and the granularity (particle size) distribution of the reinforcement materials are made uniform enough to fix the viscosity of resin in which the reinforcement materials have been kneaded and dispersed. Thus, the lamp reflector has a substrate in which desired surface smoothness and rigidity are ensured, while the dimensional accuracy is high (because the substrate is a molded product). It is also an object of the present invention to provide a method of manufacturing such a lamp reflector.

LAMP REFLECTOR AND METHOD OF MANUFACTURING THE SAME

BACKGROUND OF THE INVENTION

1. Field of the Invention

The present invention relates to a lamp reflector, particularly a lamp reflector suitable for a head lamp, a fog lamp, or the like, mounted on a two-wheel or four-wheel vehicle, or the like; and a lamp reflector manufacturing method. More particularly, the present invention relates to a lamp reflector which has a substrate high in surface smoothness due to the material composition of a substrate constituting the lamp reflector, and also relates to a method for manufacturing such a lamp reflector.

2. Description of the Related Art

Currently, thermoplastic resin, for example, polyphenylene sulfide resin (PPS resin) is used as a basic material (base resin) of a substrate constituting a lamp reflector for use in a head lamp or a fog lamp for a vehicle. A reinforcement material such as whiskers, calcium carbonate powder, or the like, is kneaded and dispersed into the basic material in order to enhance the rigidity and increase the molding dimensional stability and the heat resistance.

Specifically, wollastonite (calcium silicate whiskers) or heavy calcium carbonate occurring in nature is used as the whiskers or the calcium carbonate powder. Such a substance is crushed and classified into powder with desired grain size, and the thusly obtained powder is kneaded into the basic material.

Figure 9:
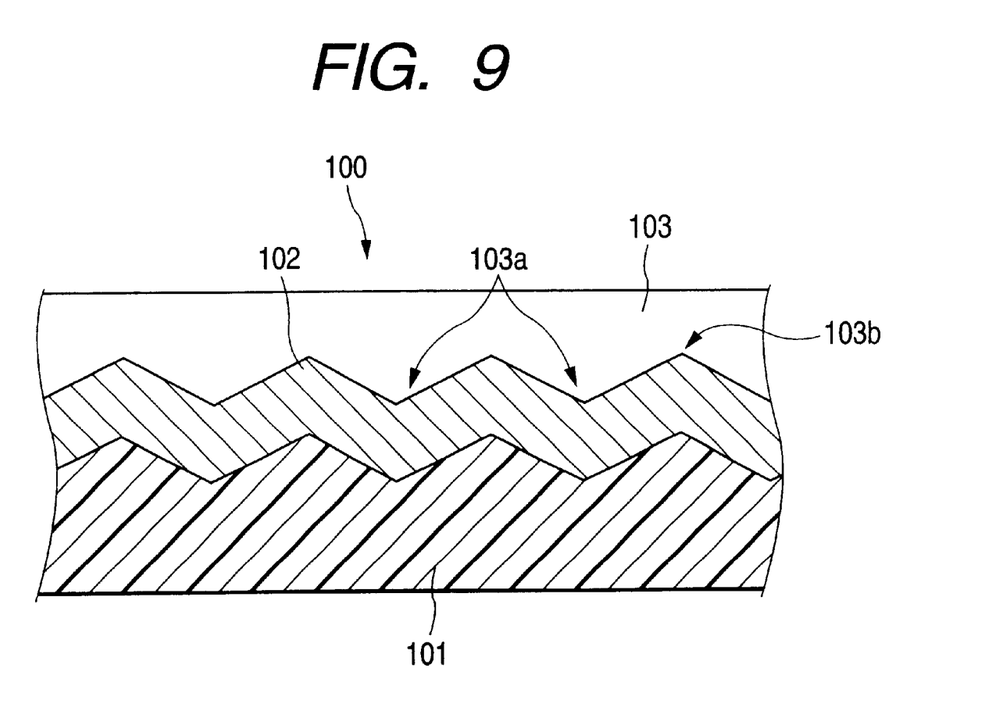
FIG. 9 is sectional view showing the configuration of a related-art lamp reflector.

FIG. 9 schematically shows a partial section of a related-art lamp reflector 100.

The surface of a substrate 101 made of the aforementioned material composition exhibits a rough surface with irregularities. The surface of a metal coating 102 of aluminum or the like, which is provided on the upper surface of the substrate 101, is affected by the irregularities of the surface of the substrate 101. Thus, the surface of the metal coating 102 has irregularities.

The aforementioned related art has the following technical problems.

First, natural wollastonite (calcium silicate whiskers) and heavy calcium carbonate used as reinforcement material differ—in their constituent components and granular shape of the powder obtained by crushing—in accordance with a mine where they were mined. In addition, the granular shape of the power also varies in accordance with the particular crushing method used.

Accordingly, when resin obtained by kneading such a natural reinforcement material is subjected to injection molding, the melting viscosity is not constant; that is, the melting viscosity varies. Therefore, it becomes difficult to ensure the smoothness of the substrate surface, or it becomes difficult to ensure dimensional accuracy. To prevent such difficulties, there was a disadvantageous technique wherein the temperature of a mold or the conditions of injection molding always had to be controlled in accordance with the properties of the resin.

In addition, when a thick top coat 103 is formed as a protective film on the related-art lamp reflector 100, the film thickness of the top coat 103 becomes larger in concave portions 103a of the metal coating 102 while the film thickness becomes smaller in convex portions 103b of the metal coating 102. Accordingly, there occurs a difference in optical refractive index between the concave portion 103a and the convex portion 103b. As a result, there arose a problem that fog generated in the concave portions 103a had a bad influence on the light distribution performance.

SUMMARY OF THE INVENTION

It is therefore an object of the present invention to provide a lamp reflector in which reinforcement materials to be kneaded and dispersed into a basic material forming a substrate of the lamp reflector are specified so that the particle shape and the granularity (particle size) distribution of the reinforcement materials are made uniform enough to fix the viscosity of resin in which the reinforcement materials have been kneaded and dispersed. Thus, the lamp reflector has a substrate in which desired surface smoothness and rigidity are ensured, while the dimensional accuracy is high (because the substrate is a molded product). It is also an object of the present invention to provide a method of manufacturing such a lamp reflector.

In order to attain the foregoing and other objects, the present invention includes the following aspects.

In a lamp reflector according to a first aspect of the present invention, the reflector is provided with a substrate made of a composition containing at least polyphenylene sulfide resin (PPS resin), synthetic calcium carbonate whiskers, and synthetic calcium carbonate ($CaCO_3$).

In this aspect, natural substances having uneven properties are not used. Instead, fibrous synthetic calcium carbonate whiskers and granular synthetic calcium carbonate ($CaCo_3$)—having even, consistent, properties—are used as reinforcement materials to be kneaded into polyphenylene sulfide resin (hereinafter referred to as "PPS resin") adopted as a basic material of the substrate forming the lamp reflector.

Thus, the surface smoothness and the rigidity are made compatible. That is, the viscosity of the resin in which the reinforcement materials have been kneaded and dispersed is made constant, so that a substrate—of a lamp reflector, which substrate is a molded product—having a high dimensional accuracy can be obtained.

In addition, there is eliminated such a problem that the temperature of a mold, or the conditions of injection molding always must be adjusted in accordance with the properties of the resin in which the reinforcement materials have been kneaded and dispersed. Thus, the productivity is improved.

In a lamp reflector according to a second aspect of the invention, the composition of the substrate constituting the lamp reflector is compounded and adjusted so that the PPS resin of the first aspect is in a range of from 30 weight % to 50 weight %, the synthetic calcium carbonate whiskers of the first aspect are in a range of from 5 weight % to 40 weight %, and the synthetic calcium carbonate of the first aspect is in a range of from 20 weight % to 60 weight %.

In this second aspect, the surface smoothness and the rigidity of the substrate can be made compatible more surely, and workability by injection molding is also enhanced.

Specifically, if the content of PPS resin is much, the surface smoothness of the substrate will be ensured easily, but the rigidity and the heat resistance will deteriorate. On the contrary, if the content of synthetic calcium carbonate whiskers or synthetic calcium carbonate is too much, the rigidity will be ensured, but the surface smoothness will deteriorate. In addition, because PPS resin is reduced relatively, the flowability of molding resin will be lowered so that injection molding will be difficult. However, in the aforementioned second aspect of the invention, each of the requirements for the surface smoothness, the rigidity of the substrate, and the molding ease is satisfied.

Incidentally, injection molding is one of the typical techniques in a resin molding method. According to this technique, molten resin material is put into a metal mold under pressure, and is then solidified and molded by cooling if it is a thermoplastic resin or by heating if it is a thermosetting resin.

In a lamp reflector according to a third aspect of the invention, the substrate contains the synthetic calcium carbonate according to either the first or the second aspects, and also has an average particle size not larger than 2 $\mu$m.

In this third aspect, the granular shape of synthetic calcium carbonate is maintained not larger than a constant size. Thus, the surface smoothness of the molded substrate is ensured more reliably.

In a lamp reflector according to a fourth aspect of the invention, a reflecting mirror surface made of a metal coating is formed directly on a surface of the substrate according to any one of the first to third aspects and a protective film (top coat) for preventing metal degradation is formed on a surface of the reflecting mirror surface.

In this fourth aspect, a reflective metal coating of aluminum or the like can be formed directly on the substrate surface to form a reflecting mirror surface. Accordingly, it is not necessary to provide an under coat layer which may have a bad influence on the heat resistance of the metal coating surface. Thus, the heat resistance is enhanced.

In addition, because it is not necessary to provide an under coat layer, a process of treating an organic solvent contained in the under coat waste liquor can be eliminated, thereby avoiding unsanitary environmental problems. Further, a process of solidifying the under coat is eliminated, so that the process is simplified and productivity is improved.

In a lamp reflector according to a fifth aspect of the invention, the lamp reflector is divided into a plurality of surfaces by divisional boundary portions, wherein a step is formed in each divisional boundary portion. With a configuration, injection molding is easily performed. Further, a desired plane smoothness and a desired rigidity are ensured.

Also, in a stepped reflecting mirror which is designed to control the light distribution only by using the plurality of surfaces on the reflecting mirror, an under coat layer is eliminated by the configuration of the fourth aspect. As a result, there is no irregular reflection due to the under coat layer, as there is in the related art wherein the under coat layer is gathered in step portions, which has been problematic hitherto. Thus, it is possible to obtain an excellent light distribution.

In a lamp reflector according to a sixth aspect of the invention, a lamp reflector defined in any one of the first to fifth aspects is obtained by injection molding using high pressure gas.

In this sixth aspect, injection molding with high-pressure gas can be performed under the condition wherein the properties of the resin material—which is prepared for the injection molding and in which reinforcement materials have been kneaded and dispersed—are stabilized. Thus, the substrate can be molded with a high dimensional accuracy.

Accordingly, the lamp reflector of present invention contributes a technically significant improvement in the quality performance of the lamp reflector which is disposed in a head lamp, a fog lamp, or the like, mounted on a two-wheel or four-wheel car, or the like. Further, the method of manufacturing the lamp reflector according to the present invention improves productivity in the process for manufacturing the lamp reflector.

BRIEF DESCRIPTION OF THE DRAWINGS

FIG. 3 (d) is a table showing a composition in Comparative example 3 which entirely is made of polyether imide resin.

FIG. 7 (a) is a horizontally sectional view of a vehicle tail lamp provided with a stepped reflecting mirror; and FIG. 7 (b) is a sectional view of an enlarged part (portion Y) of the stepped reflecting mirror as shown in FIG. 7(a)

FIG. 8 (b) is a view showing schematically an injection molding method in which injected resin is pressurized from its inside by high-pressure gas.

DETAILED DESCRIPTION OF THE PREFERRED EMBODIMENTS

Next, preferred embodiments of the present invention will be described with reference to the accompanying drawings.

Figure 1:
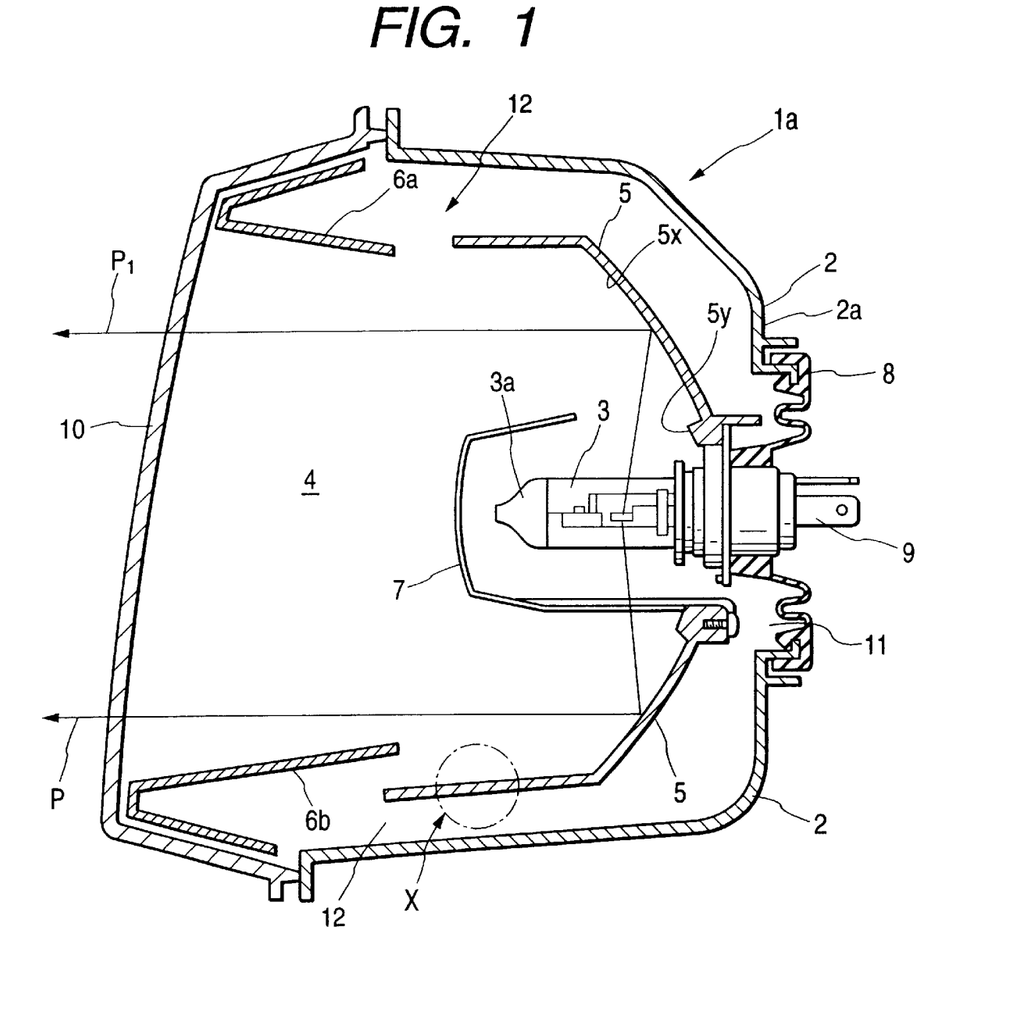
FIG. 1 is a longitudinal cross-sectional view of a vehicle front lamp in which a lamp reflector according to the present invention is disposed.

First, a brief description will be made about the configuration of a vehicle headlamp 1a in which a lamp reflector according to the present invention is disposed. A longitudinal cross-sectional view of the vehicle head lamp 1a is shown in FIG. 1.

The vehicle lamp 1a is formed substantially into a bowl. The vehicle lamp 1a includes a lamp body 2 having an opening portion 11, a rubber cover 8, a lamp chamber 4, and a front lens 10. The opening portion 11, for attaching a light source bulb 3, is provided in a rear top portion 2a of the lamp body 2. The rubber cover 8 seals off the opening portion 11, and the light source bulb 3 is attached to this rubber cover 8 so as to be disposed in a lamp chamber 4 inside the lamp body 2. The front lens 10 is attached to the lamp body 2 so as to close a front opening portion of the lamp body 2.

Then, a lamp reflector 5 and a shade 7 are disposed around the light source bulb 3. The lamp reflector 5 is a member which has a reflecting mirror surface for reflecting light $P_1$ emitted from the light source bulb 3 toward the front of the vehicle so as to form external irradiation light. Such a lamp reflector 5 is generally called a "reflector". The shade 7 covers a top portion 3a of the light source bulb 3. The top portion 3a is painted black to block forward-traveling light from the light source bulb 3 so as to make the top portion 3a inconspicuous when viewed from the outside. Incidentally, the reference numeral 6 (6a, 6b) represents an extension reflector for covering a gap 12 between the lamp reflector 5 and the lamp body 2.

Figure 2:
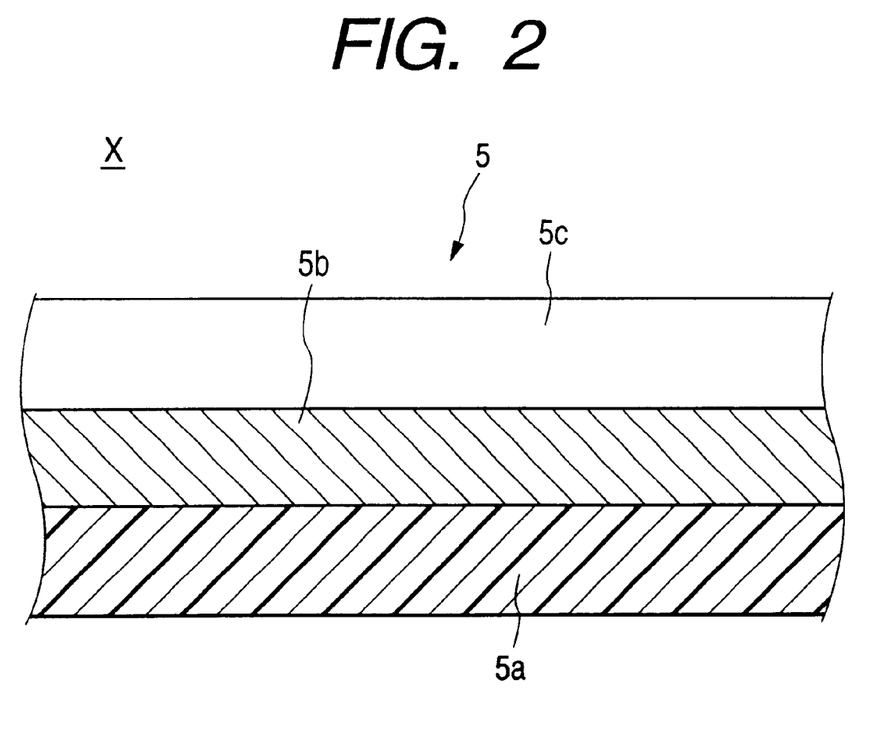
FIG. 2 is a schematic cross-sectional view of an enlarged part of a lamp reflector 5 designated by the symbol X in FIG. 1.
Figure 3A:
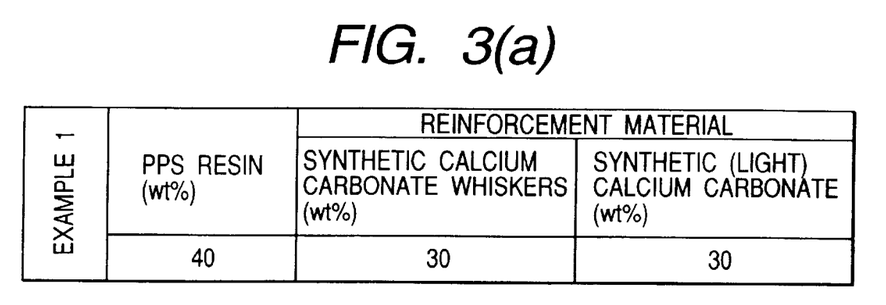
FIG. 3(a) is a table showing a composition of a substrate in Example 1 of a lamp reflector according to the present invention.
Figure 3B:
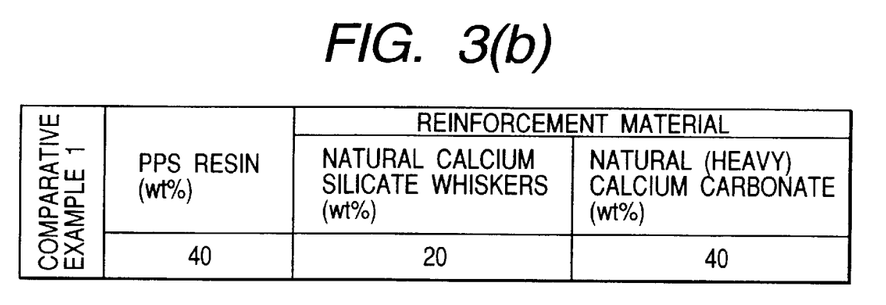
FIG. 3(b) is a table showing a composition in Comparative example 1 in which reinforcement materials made of natural calcium silicate whiskers and natural calcium carbonate are mixed into PPS resin.
Figure 3C:
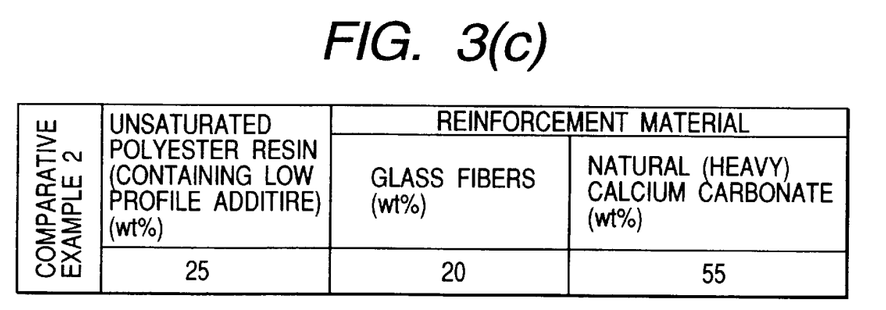
FIG. 3(c) is a table showing a composition in Comparative example 2 in which reinforcement materials made of glass fibers and natural calcium are mixed into unsaturated polyester resin.
Figure 3D:
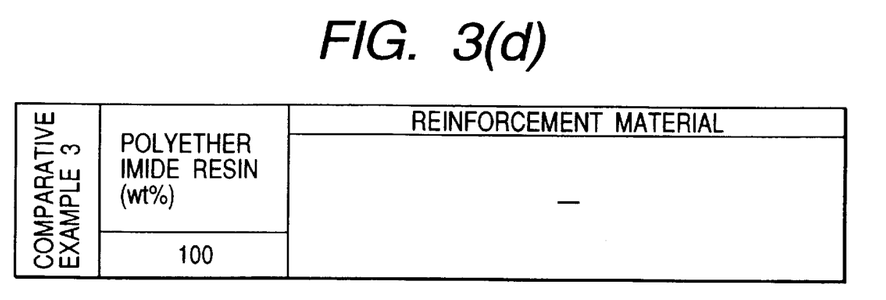

Next, the structure of the lamp reflector 5 according to the present invention will be described with reference to FIG. 2 which is a schematic sectional view of an enlarged part of the lamp reflector 5 designated by the symbol X in FIG. 1.

First, the lamp reflector 5 has a substrate 5a which forms a basic shape of the lamp reflector 5. The material composition of the substrate 5a contains PPS resin, which is a thermoplastic resin, as a basic material or base resin. Further, the material of the substrate 5a includes specific reinforcement materials kneaded and dispersed into the base resin in order to enhance rigidity (as will be described later).

Next, a metal coating 5b (such as an aluminum coating) is formed directly on the substrate 5a, without providing any under coat layer, to form a reflecting mirror surface. A top coat 5c, made of transparent material, is provided on the aluminum coating 5b. Thus, the lamp reflector 5 has a three-layer structure of the substrate 5a, the metal coating 5b, and the top coat 5c. Incidentally, the top coat layer 5c is a transparent protective film for preventing the aluminum coating 5b from damage, deterioration, or the like.

Here, description will be made about the composition of the substrate 5a, which is one of the features of the present invention.

The substrate 5a is formed of at least base resin and reinforcement materials mixed therein to enhance the rigidity of the base resin. PPS resin is selected as the base resin, and synthetic calcium carbonate whiskers and synthetic calcium carbonate ($CaCO_3$) are adopted as the reinforcement materials.

Thermosetting resins such as unsaturated polyester resin or the like, as well as heat-resistant thermoplastic resins such as polyether imide, polyether sulfone, polyphenylene ether, heat-resistant polycarbonate, etc. also have been used as the base resin of the substrate 5a. However, a method of injection molding with thermoplastic resin, particularly PPS resin, is preferred because it is very advantageous from the point of view of enhancing heat resistance, making the lamp reflector lighter in weight, and increasing productivity.

Examples of materials of the reinforcing synthetic whiskers include calcium carbonate whiskers, calcium silicate whiskers, aluminum borate whiskers, potassium titanate whiskers, magnesium sulfate whiskers, etc. Examples of reinforcing synthetic granular materials kneaded into the basic material together with the synthetic whiskers, include colloidal calcium carbonate, aluminum oxide, synthetic (light) calcium carbonate, calcium sulfite, precipitated barium sulfate, glass beads, silica beads, etc. Particularly, a combination of synthetic calcium carbonate whiskers and synthetic calcium carbonate granular reinforcing material is preferable because these materials are inexpensive and provide desired surface smoothness while also providing desired rigidity.

Accordingly, natural substances—which have uneven properties—are not used in the present invention. Instead, synthetic calcium carbonate whiskers and synthetic calcium carbonate ($CaCO_3$), which have even properties and which are inexpensive, are selected to be kneaded and dispersed into the PPS base resin of the substrate 5a forming the lamp reflector 5. Thus, desired surface smoothness and rigidity are ensured.

Also, the viscosity of the molding resin in which the reinforcement materials have been kneaded and dispersed can be made constant so as to avoid the problem that the temperature of a mold or the conditions of injection molding always must be adjusted in accordance with the properties of the molding resin. As a result, injection molding becomes easy, and a lamp reflector provided with a molded substrate having a high dimensional accuracy can be obtained.

The inventors of the present application conducted a comparative test on a lamp reflectors 5 with respect to points of substrate surface smoothness, top coat durability (evaluated by alkali test), rigidity (bending modulus), heat resistance, and light distribution performance. Example 1, made according to the present invention, had a substrate 5a (with no under coat layer) with a composition of 40 weight % (hereinafter referred to as "wt %") of PPS resin, 30 wt % of synthetic calcium carbonate whiskers and 30 wt % of synthetic (light) calcium carbonate as shown in FIG. 3(*a*). Comparative examples 1 to 3 had substrates with compositions shown in FIGS. 3(*b*) to (*d*), respectively.

The lamp reflectors of Example 1 and Comparative examples 1 to 3 used in this test were manufactured as follows. The components shown in FIGS. 3(*a*) to 3(*d*) were kneaded and dispersed; the substrates of the lamp reflectors were formed by the method of injection molding; common activation treatment was applied to the respective substrates so as to form metal coatings thereon; and then top coats were provided on respective metal coatings.

A description of specific methods used in this test will now be set forth. First, the surface smoothness was measured with a surface profilometer "DEKTAK 3030" made by ULVAC JAPAN, Ltd. Ra designates average surface roughness; and Rt, maximum height (unit: $\mu$m).

The top coat durability, evaluated by an alkali test, was measured in the following manner. A lamp reflector was immersed in a potassium hydrate (KOH) solution with a concentration of 1 wt % at room temperature for 10 minutes. Then, the lamp reflector was taken out and observed visually as to the existence of abnormalities in the coating surface, wherein the abnormalities include: discoloring; smudging; whitening; softening; bulging; peeling; or the like.

The bending modulus was measured by JIS plastic K7203 in the conditions of a specimen height of 3 mm by a specimen width of 12 mm, a fulcrum-to-fulcrum distance of 50 mm, and a test speed of 1.5 mm/min. The heat resistance was measured by the following method. Vapor deposition was applied to a test plate. Then, the test plate was left in an air oven at a predetermined temperature for 24 hours. Then, the test plate was put back at room temperature and observed visually as to the existence of abnormalities in the vapor deposited surface, wherein the abnormalities include: bulging; peeling; discoloring; or the like.

The light distribution performance was measured by the following method. A stepped lamp reflector (see FIGS. 8(a) and 8(b)) was tested to determine whether or not the stepped lamp reflector satisfied light distribution standards such as Japanese safety standards, European ECE Standards, FMVSS108 Clause (US), and so on. Further, a stepped lamp reflector was tested to determine whether or not the displacement of an optical axis 60 minutes after lighting the lamp was not larger than 0.057 degrees, with respect to the position of the optical axis 3 minutes after lighting the lamp.

The result of the aforementioned comparative test will be described with reference to the table in FIG. 4.

First, as for the surface smoothness, the average roughness Ra was 24 nm and the maximum height Rt was 200 nm in Example 1. Therefore, the surface smoothness was improved on a large scale in comparison with that in Comparative example 1 in which natural calcium whiskers and natural calcium were used as reinforcement materials and in which the average roughness Ra was 43 nm and the maximum height Rt was 330 nm. That is, a low average roughness Ra and a low maximum height Rt are regarded as optimum in the art.

Next, as for the durability (alkali resistance) of a top coat layer, it is desirable to ensure durability while the top coat layer is made as thin as possible. A thin top coat layer is advantageous from a point of view of the cost, the prevention of irregular reflection of light, or the like.

Accordingly, the test in which the durability was judged was performed in four stages of thickness of 30 nm, 50 nm, 100 nm and 200 nm. The durability could be ensured in Example 1 though the thickness of the top coat layer was 50 nm. On the other hand, in Comparative example 1, though a lamp reflector having no under coat layer could be formed, enough durability could not be obtained unless the thickness of a top coat was made 200 nm or more.

If the top coat is thick, as described above and as in Comparative example 1, longer work time (to form a film), and a larger volume of material, are required. Therefore, such a thick top coat layer is disadvantageous also in the points of productivity and material cost.

Figure 4:
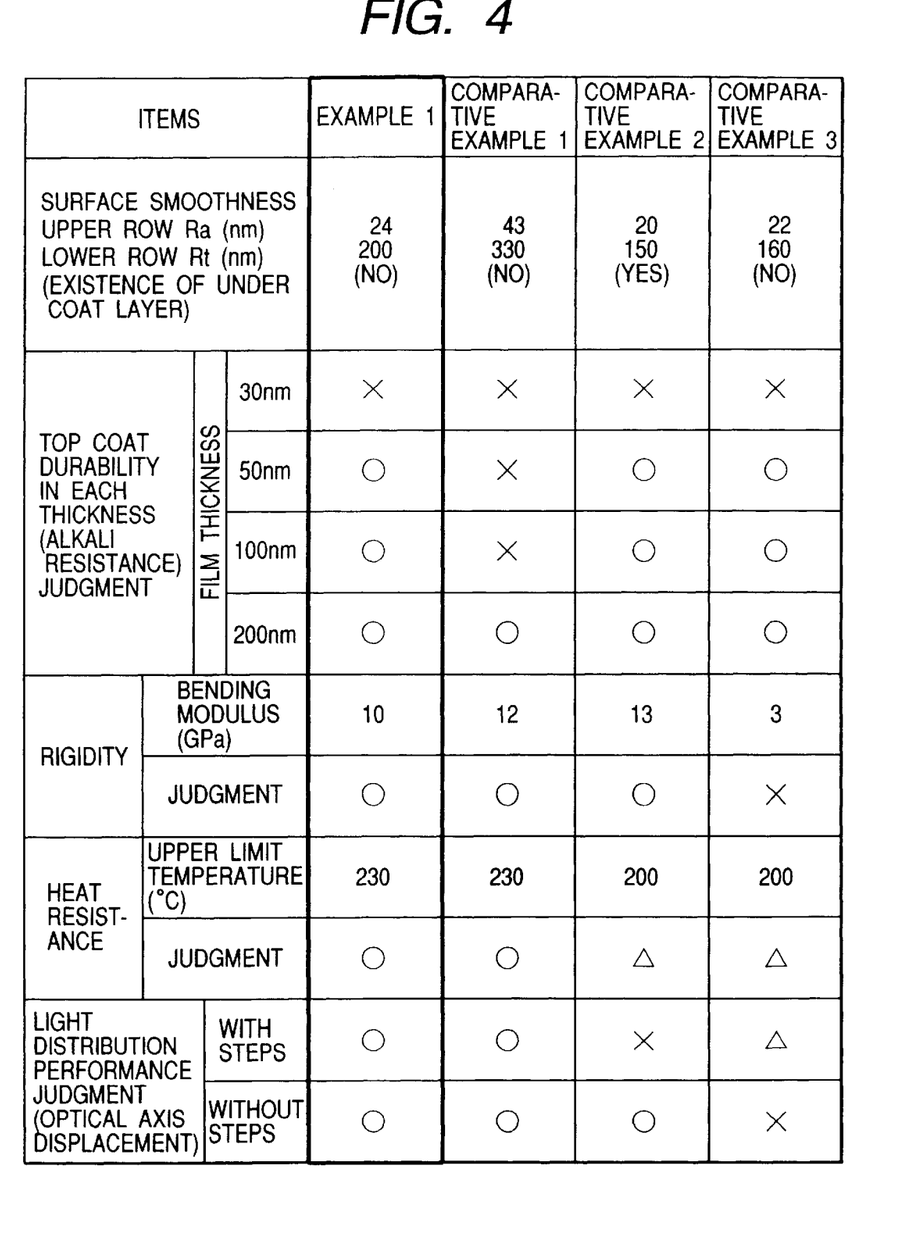
FIG. 4 is a table showing data of experimental test results of surface smoothness, and so on, for respective lamp reflectors in Example 1 and Comparative examples 1 to 3 shown in FIGS. 3(a) to 3(d).

As for the rigidity (bending modulus), excellent results could be obtained both in Example 1 and in the Comparative example 1 (the symbol ○ designates excellent result of judgment in FIG. 4). If the rigidity of a substrate is low, the profile retention property deteriorates when an optical axis is adjusted. In order to avoid this deterioration, increasing the thickness of the substrate 5a itself so as to enhance the rigidity has been considered, but such is not regarded as preferable in view of workability and cost.

As for the heat resistance and the light distribution performance, excellent results could be obtained both in Example 1 and Comparative example 1. When the light source bulb 3 in the lamp chamber 4 inside the lamp body 2 is turned on, the temperature in a portion 5x of the reflecting mirror 5 rises to about 180° C. due to the heat generated from the light source bulb 3. Further, the temperature in a portion 5y of the reflecting mirror 5 reaches 200° C. Example 1 was extremely excellent in heat resistance because the reflecting mirror 5 was heat resistant to the temperature of 230° C.

Incidentally, as shown in FIG. 4, the surface smoothness in Comparative examples 2 and 3 was equal or superior to that in Example 1. However, required rigidity could not be obtained in Comparative example 3. Also, there were problems in the heat resistance and the light distribution performance in Comparative examples 2 and 3. See FIG. 4, wherein the symbol Δ designates a little failed result of judgment, and the symbol X designates failed result of judgment.

As described above, there was observed a conspicuous difference in surface smoothness between the lamp reflector in Example 1 and the lamp reflector in Comparative example 1 which is typical of the related art. In addition, the lamp reflector in Example 1 was satisfactory in all of the requirements for the top coat durability, the substrate rigidity, the heat resistance and the light distribution performance.

Next, the inventors of the present application repeated more detailed experiments regarding the composition of the substrate 5a constituting the lamp reflector 5 according to the present invention. As a result, the present inventors found that it was preferable to compound and adjust the composition so that: the amount of PPS base resin was in a range of from 30 wt % to 50 wt %; the amount of synthetic calcium carbonate whiskers stated in the present invention was in a range of from 5 wt % to 40 wt%; and the amount of synthetic calcium carbonate stated in the present invention was in a range of from 20 wt% to 60 wt %.

Next, the reason why the aforementioned ranges are preferable will be described with reference to FIG. 5 which is a composition diagram by weight percentages of three components of resin mixture: PPS resin; synthetic calcium carbonate whiskers; and synthetic calcium carbonate.

First, in the area designated by the symbol B, a large amount of reinforcing synthetic calcium carbonate whiskers are included so that the rigidity is superior but the surface smoothness is inferior. In the area designated by the symbol C, a large amount of PPS resin is contained so that the substrate surface smoothness is ensured easily but the rigidity and the heat resistance are inferior.

In the area designated by the symbol D, the content of PPS resin is insufficient, and the content of synthetic calcium carbonate whiskers is also low, so that neither the surface smoothness nor the rigidity can be ensured. In the area designated by the symbol E, the content of PPS resin is too small so that the flowability is inferior. As a result, it becomes difficult to injection-mold a lamp reflector having a complicated shape.

From the above knowledge obtained by experiments, the surface smoothness and the rigidity of the substrate 5a can be made compatible by a composition corresponding to the area designated by the symbol A. In addition, flowability can be ensured in resin kneaded and prepared for molding, so that the workability in injection molding becomes excellent. Therefore, such resin is very preferable. That is, the kneaded resin can satisfy all the requirements with respect to the surface smoothness, the rigidity, and the molding ease of the substrate 5a.

Figure 5:
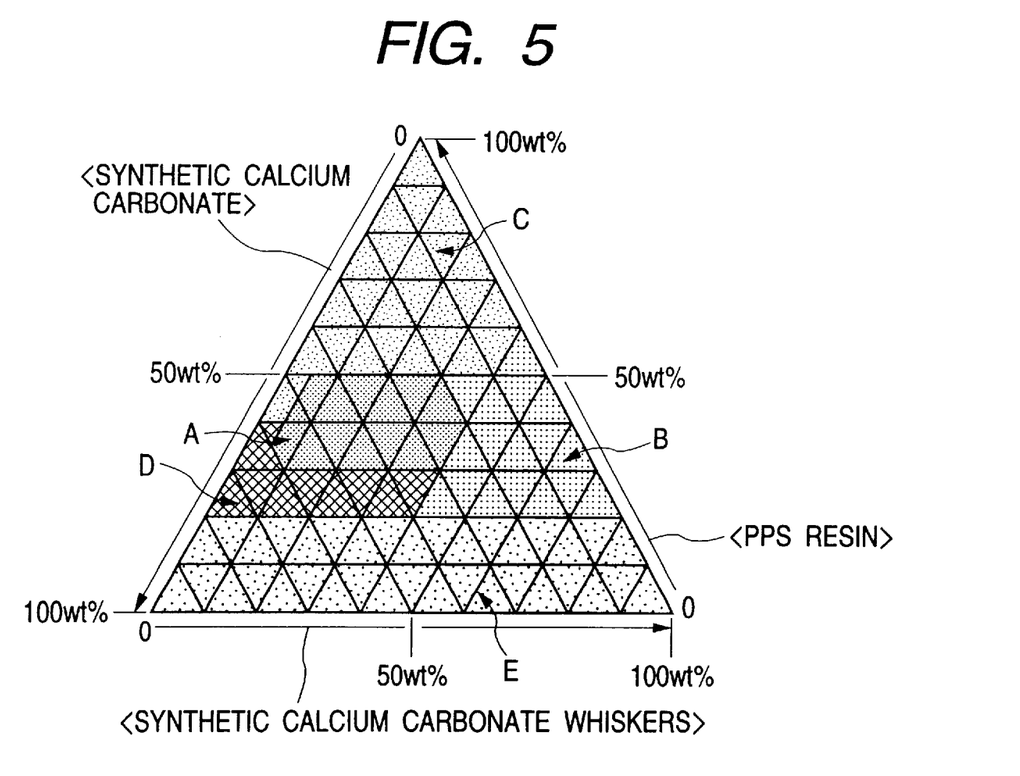
FIG. 5 is a composition diagram by weight percentages of three components of resin mixture: PPS resin; synthetic calcium carbonate whiskers; and synthetic calcium carbonate.
Figure 6:
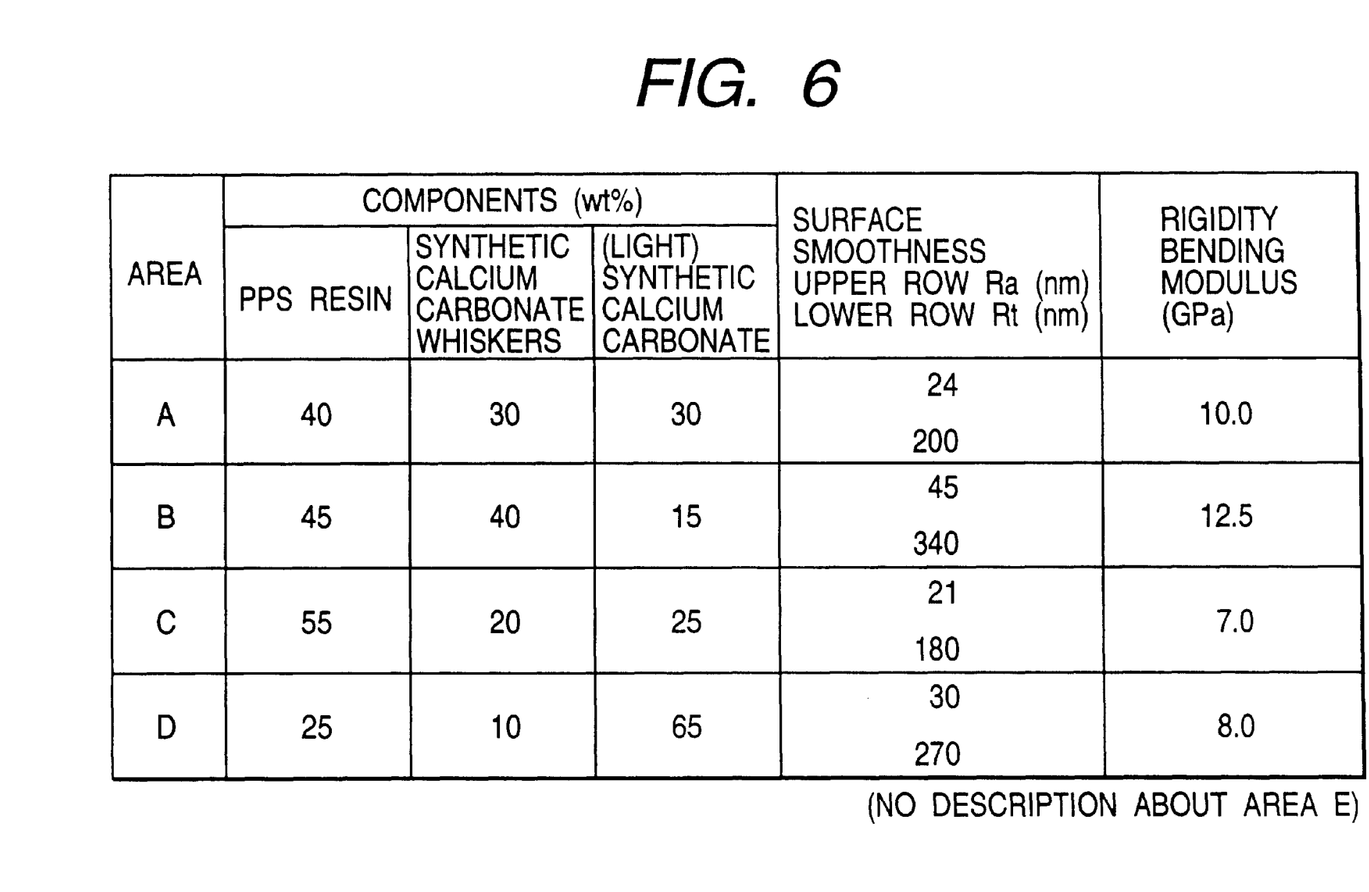
FIG. 6 is a table showing measured data of surface smoothness and rigidity (bending modulus) on respective substrates made of kneaded resins having compositions corresponding to the areas A to D (area E is not included) shown in FIG. 5.

FIG. 6 shows data of surface smoothness and rigidity (bending modulus) for kneaded resins with compositions corresponding to the areas A to D (resin of area E is omitted because of insufficient flowability to produce a reflecting mirror) shown in FIG. 5, respectively. From the data shown in FIG. 6, data of surface smoothness Ra 24 nm and Rt 200 nm and bending modulus 10.0 GPa are obtained in kneaded resin with a composition containing 40 wt % of PPS resin, 30 wt % of synthetic calcium carbonate whiskers, and 30 wt % of synthetic calcium carbonate, i.e., for resin composition corresponding to area A. Thus, the kneaded resin satisfies both the surface smoothness and the rigidity (bending modulus).

Incidentally, the rigidity in the area B is larger than that in the area A, but the surface smoothness is inferior. In the area C, the surface smoothness is superior to that in the area A, but the rigidity is inferior. In the area D, both the surface smoothness and the rigidity are inferior to those in the area A.

Next, the inventors of the present application found that the fiber length and diameter of synthetic calcium carbonate whiskers, as well as the particle size of synthetic calcium carbonate, which were kneaded in the substrate 5a forming the lamp reflector according to the present invention were important factors determining the surface smoothness of the substrate 5a.

It was proved that the surface smoothness of the substrate 5a could be further enhanced if it contained: synthetic calcium carbonate whiskers having a fiber length in a range of from 3 μm to 40 μm and having a fiber diameter in a range of from 0.2 μm to 2 μm; and synthetic calcium carbonate particles having an average size not larger than 2 μm.

That is, if the fiber length of synthetic calcium carbonate whiskers is shorter than 3 μm or the fiber diameter is shorter than 0.2 μm, the fibers cannot ensure the requisite rigidity. If fibers longer than 40 μm in length or more than 2 μm in diameter are contained, irregularities are apt to be formed in the surface of the substrate 5a. These irregularities have a bad influence, and disadvantageously affect the surface smoothness.

In addition, the average particle size of synthetic calcium carbonate has noticeable influence on the substrate surface smoothness. In the case where the average particle size is 0.2 μm, the surface smoothness is expressed by Ra=23 nm and Rt=200 nm. In the case where the average particle size is 2 μm, the surface smoothness is expressed by Ra=24 nm and Rt=200 nm. However, in the case where the average particle size is 4 μm, the surface smoothness will likely increase to Ra=36 nm and Rt=260 nm. It is therefore preferable to maintain the average particle size of synthetic calcium carbonate not larger than 2 μm.

A reflecting mirror surface made of a metal coating 5b is formed directly on the surface of the substrate 5a, having the aforementioned composition or properties, by a vapor deposition method or a sputtering method. The reflecting mirror surface formed on the smooth surface of the substrate 5a is also smooth. As a result, it is possible to form a reflecting mirror surface which has no optical warp and is high in light distribution accuracy.

In addition, the top coat 5c provided on the smooth surface of the reflecting mirror, having few irregularities, can be made thinner. The thinner top coat 5c is possible because there is no fear that the reflecting mirror surface will come close to the surface of the top coat 5c or be exposed therefrom even if the top coat 5c is made thinner. Therefore, the reflecting mirror 5 of the present invention is extremely advantageous in terms of durability, productivity, cost reduction, and weight savings.

Further, the top coat 5c can be formed to have uniform thickness so that light incident to the top coat 5c is prevented from irregular reflection. As a result, no fog is formed on the lamp reflector, and the light distribution performance of the lamp reflector is enhanced.

That is, there can be solved all of such problems: that external irradiation light P from the light source bulb 3 cannot be reflected and controlled accurately so as to reduce the glare for an oncoming vehicle; and that predetermined light distribution standards are not satisfied.

In addition, the aforementioned configuration according to the present invention is also applicable to a stepped reflecting mirror 13 which itself controls light distribution. The reflecting mirror 13 has active reflecting surfaces 14 formed by dividing the reflecting mirror surface into a plurality of faces in order to control light distribution, and has division boundary portions 15 provided with steps 15a respectively, as shown in FIGS. 7(a) and 7(b).

Figure 7A:
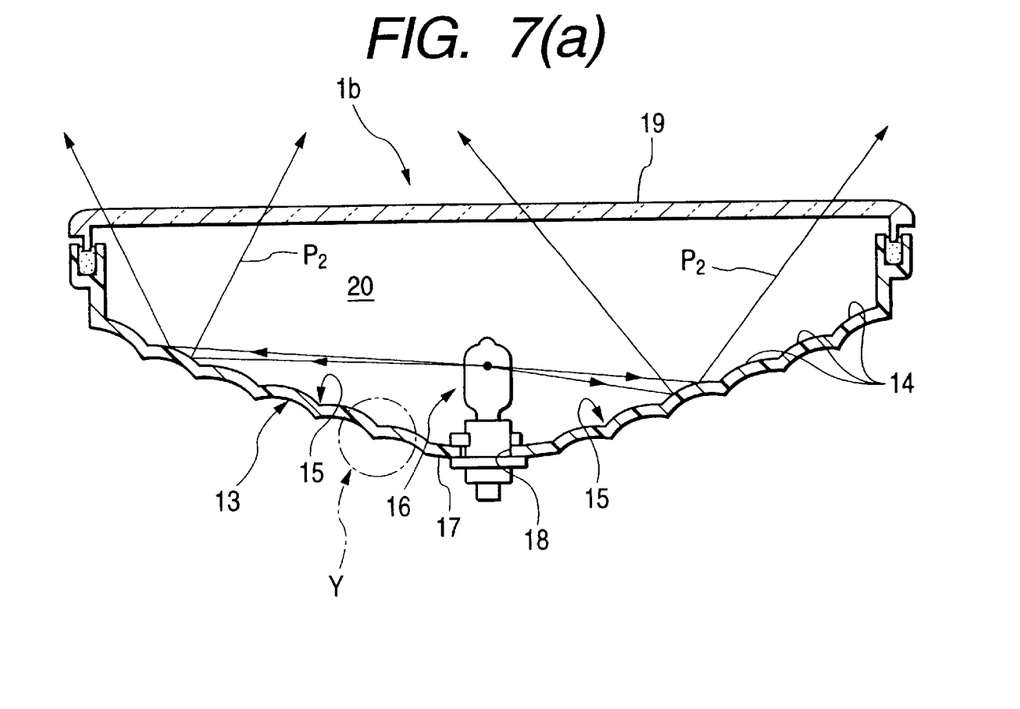
Figure 7B:
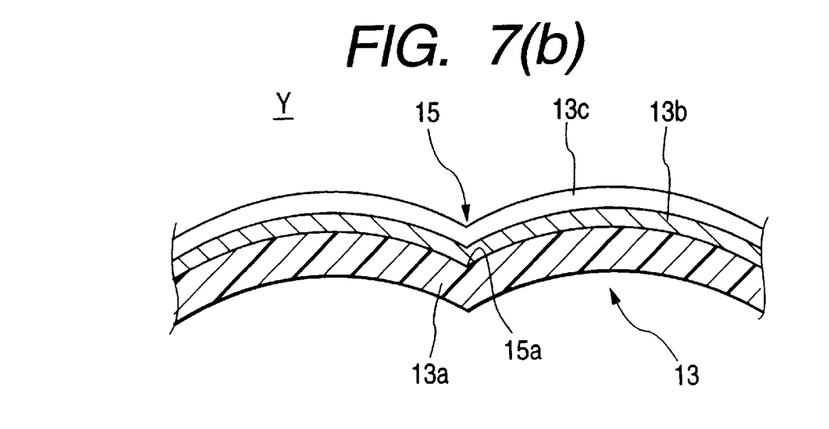

FIG. 7(a) shows a horizontal sectional view of a vehicle tail lamp 1b provided with the stepped reflecting mirror 13. FIG. 7(b) shows a partially enlarged sectional view of the stepped reflecting mirror 13.

First, the configuration of the vehicle lamp 1b will be described briefly. The vehicle lamp 1b has a lamp reflector 13 in which an opening portion 18 is provided in a rear top portion 17 of the vehicle lamps 1b. A front lens 19 having a functional color, such as red, is attached to the lamp reflector 13 so as to close a front opening portion of the lamp reflector 13.

A light source bulb 16, inserted from the opening portion 18, is disposed inside a lamp chamber 20. The lamp reflector 13 is disposed around the light source bulb 16. The lamp reflector 13 reflects light emitted from the light source bulb 16 so as to form external irradiation light $P_2$.

Here, the lamp reflector 13 has a structure in which a plurality of active reflecting split-surfaces 14, extending vertically like strips, are arranged continuously in the left-right direction. Each of these active reflecting split-surfaces 14 has a parabolic shape in section to diffuse and reflect the light emitted from the light source bulb 16.

As shown in FIG. 7(b), in which a portion designated by the symbol Y in FIG. 7(a) is enlarged, the lamp reflector 13 has a three-layer structure in the same manner as the aforementioned lamp reflector 5. That is, the lamp reflector 13 is constituted by: a substrate 13a having a composition in which synthetic calcium carbonate whiskers and synthetic calcium carbonate are kneaded and dispersed as reinforcement materials in PPS resin which is a base resin; a metal coating 13b of aluminum or the like provided on the substrate 13a; and a top coat 13c provided on the metal coating 13b.

A sunken step 15a is formed in a dividing boundary portion 15 between adjacent ones of the active reflecting split-surfaces 14. However, because it is not necessary to provide any under coat layer, no irregular reflection is caused by such an under coat layer gathered in such step portions 15a. Thus, it becomes possible to obtain an excellent light distribution.

In addition, there is no fear that an organic solvent, contained in the under coat waste liquor, has an unsanitary environmental influence when such an under coat layer is painted. Thus, improvements in productivity and environmental safety also can be attained.

Further, the substrate 5a or 13a forming a lamp reflector according to the present invention is superior in workability because the flowability of resin kneaded and prepared for molding can be kept constant. Thus, the substrate 5a or 13a is suitable for injection molding with high-pressure gas.

Particularly, if the substrate 5a or 13a is formed of a composition corresponding to the area designated by the symbol A in FIG. 5, it is advantageous that not only can both the surface smoothness and the rigidity of the substrate 5a or 13a be attained, but also the workability in injection molding can be ensured.

Figure 8A:
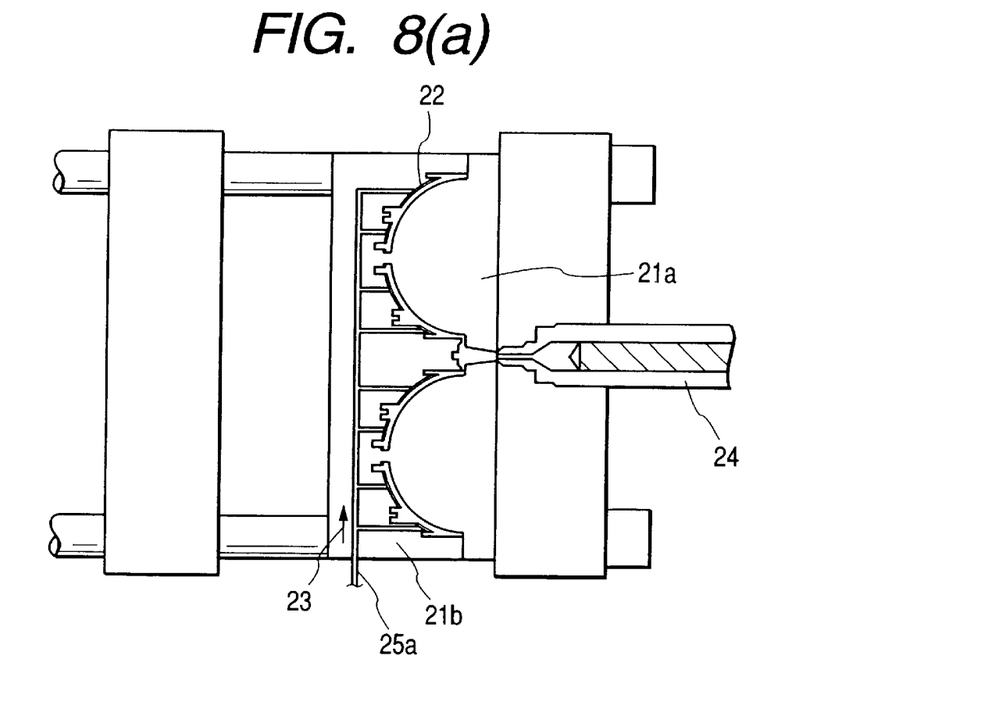
FIG. 8(a) is a view schematically showing an injection molding method in which high pressure gas is injected from a nozzle inserted in the back surface side opposite to the (kneaded) resin charged into a mold so as to press the lamp reflector onto a mold surface.
Figure 8B:
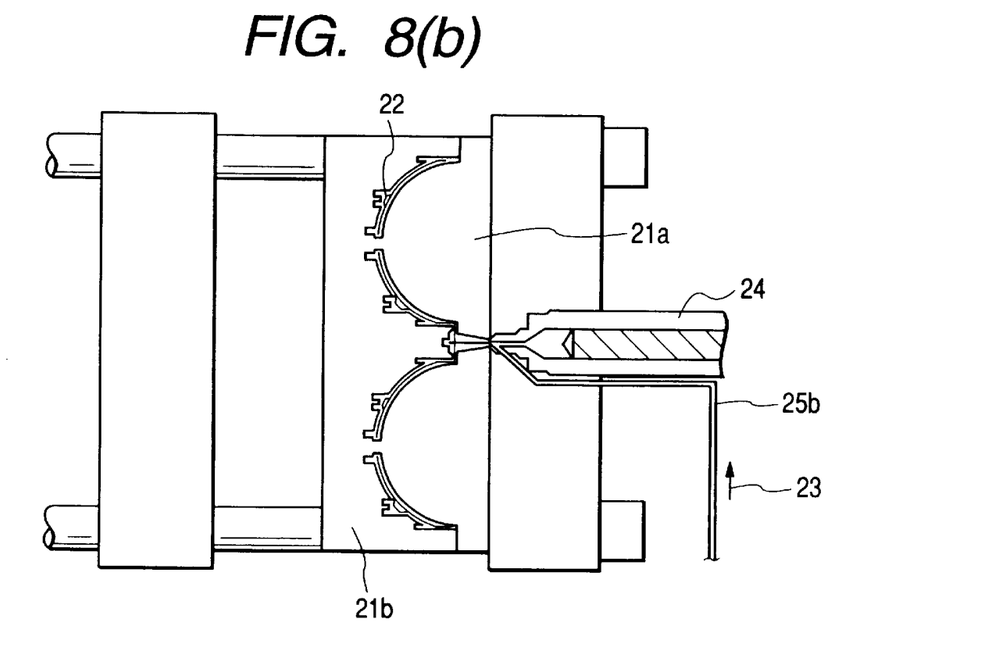

FIG. 8 schematically shows an injection molding method in which resin (kneaded with reinforcement materials) 22 is injected from an injection nozzle 24 into molds 21a and 21b and is molded therein. It is necessary to form a mold 21 precisely in anticipation of the mold shrinkage factor of the resin 22 charged into the molds 21a and 21b and the deformation dimensions after molding the resin 22. Therefore, it took much time to design the mold in the related art.

As described above, PPS resin is a thermoplastic resin having a mold shrinkage factor (0.5% to 1.0%) which is about 10 times as large as that of thermosetting resin or low profile additive containing unsaturated polyester resin composite (BMC). But PPS resin is adopted as the base resin of the substrate 5a or 13a of the lamp reflector 5 or 13 according to the present invention.

Therefore, a lamp reflector easily can be molded with an aimed dimensional accuracy by adopting a molding method in which high pressure gas is injected from a nozzle 25a inserted on the back surface side, opposite to the side on which kneaded resin is charged into the molds 21a and 21b, so as to press the lamp reflector onto the mold surface as shown in FIG. 8(a). Alternatively, a method in which injected resin is pressurized from its inside by high-pressure gas 23 from a nozzle 25b, or a method combining the above methods, can be adopted to mold the reflecting mirror with high accuracy.

As has been described above, in a lamp reflector according to the present invention, fibrous synthetic calcium carbonate whiskers and granular synthetic calcium carbonate ($CaCO_3$) having consistent properties are kneaded and dispersed into PPS resin which is a base resin of a substrate forming the lamp reflector, so that a predetermined composition is provided. Thus, both surface smoothness and rigidity of the substrate can be attained, and the viscosity of resin in which the reinforcement materials have been kneaded and dispersed is constant. As a result, there is an important effect that a lamp reflector provided with a molded substrate having a high dimensional accuracy can be obtained, and the productivity can be improved.

In addition, the average particle size of synthetic calcium carbonate, which is a reinforcement material of granular inorganic filler, is not larger than a constant size. Thus, the smoothness of the surface of the molded substrate can be ensured more reliably.

Further, because the lamp reflector according to the present invention is superior in substrate-surface smoothness, a metal coating can be formed on the substrate surface to easily provide a reflecting mirror surface. Accordingly, it is possible to eliminate an under coat layer which may have a bad influence on the heat resistance of the metal coating surface. Thus, the heat resistance of the reflecting mirror is enhanced. In addition, unsanitary environmental problems, due to waste liquor from an organic solvent necessary in forming an under coat, can be avoided. Further, the molding process is simplified and productivity is improved.

Moreover, according to the present invention, in a stepped reflecting mirror which is designed to control the light distribution only by the reflecting mirror itself, an under coat layer is not required. As a result, there is no irregular reflection due to gathering of an under coat layer in step portions. Therefore, an excellent light distribution is obtained, and the lamp reflector according to the present invention has a wide range of application.

In a lamp reflector manufacturing method according to the present invention, the properties of resin material prepared for injection molding are stabilized. Accordingly, injection molding with high-pressure gas is adopted easily so that a substrate can be molded with a high dimensional accuracy.

In such a manner, the lamp reflector and the method of manufacturing the lamp reflector according to the present invention have a technical significance which contributes to the improvement of the performance quality of the lamp reflector which is disposed particularly in a head lamp, a fog lamp, or the like, mounted on a two-wheel or four-wheel car, or the like. Also, the lamp reflector and the method of manufacturing it according to the present invention contribute to improved productivity in the process for manufacturing the lamp reflector. Accordingly, they contribute widely to the development of the related industries.

It is contemplated that numerous modifications may be made to the lamp reflector, and method of making it, of the present invention without departing from the spirit and scope of the invention as defined in the following claims.

What is claimed is:

1. A lamp reflector comprising:
   a substrate made of a composition containing at least polyphenylene sulfide resin, synthetic calcium carbonate whiskers, and synthetic calcium carbonate.

2. The lamp reflector according to claim 1, wherein said composition includes said polyphenylene sulfide resin in a range of from 30 weight % to 50 weight %, said synthetic calcium carbonate whiskers in a range of from 5 weight % to 40 weight %, and said synthetic calcium carbonate in a range of from 20 weight % to 60 weight %.

3. The lamp reflector according to claim 1, wherein said synthetic calcium carbonate has an average particle size that is not larger than 2 μm.

4. The lamp reflector according to claim 1, further comprising:
   a reflecting mirror surface made of a metal coating formed directly on a surface of said substrate; and
   a protective top coat film, for preventing metal degradation, formed on said reflecting mirror surface.

5. The lamp reflector according to claim 4, wherein said lamp reflector is divided into a plurality of surfaces by divisional boundary portions, and further wherein a step is formed in each divisional boundary portion.

6. A lamp reflector manufacturing method characterized in that a lamp reflector according to claim 1 is obtained by injection molding using high pressure gas.

7. A lamp reflector manufacturing method characterized in that a lamp reflector according to claim 2 is obtained by injection molding using high pressure gas.

8. A lamp reflector manufacturing method characterized in that a lamp reflector according to claim 3 is obtained by injection molding using high pressure gas.

9. A lamp reflector manufacturing method characterized in that a lamp reflector according to claim 4 is obtained by injection molding using high pressure gas.

10. A lamp reflector manufacturing method characterized in that a lamp reflector according to claim 5 is obtained by injection molding using high pressure gas.

11. A lamp reflector manufacturing method comprising:
    forming a composition including polyphenylene sulfide resin, synthetic calcium carbonate whiskers, and synthetic calcium carbonate;
    injecting said composition into a mold cavity; and
    injecting pressurized gas into said mold cavity.

12. The lamp reflector manufacturing method according to claim 11, wherein said step of forming a composition includes forming a composition so that said polyphenylene sulfide resin is in a range of from 30 weight % to 50 weight %, said synthetic calcium carbonate whiskers are in a range of from 5 weight % to 40 weight %, and said synthetic calcium carbonate is in a range of from 20 weight % to 60 weight %.

13. The lamp reflector manufacturing method according to claim 11, wherein said step of forming a composition includes forming a composition so that said synthetic calcium carbonate has an average particle size that is not larger than 2 μm.

14. The lamp reflector manufacturing method according to claim 11, further comprising:

forming a coating reflecting mirror surface directly on a surface of said substrate; and forming a protective top coat film, for preventing degradation of said reflecting mirror surface, on said reflecting mirror surface.

\* \* \* \* \*